United States Patent [19]
Trummer et al.

[11] Patent Number: 5,546,088
[45] Date of Patent: Aug. 13, 1996

[54] HIGH-PRECISION RADAR RANGE FINDER

[75] Inventors: Günther Trummer, Baiersdorf; Richard Körber, Putzbrunn, both of Germany

[73] Assignee: Deutsche Aerospace AG, München, Germany

[21] Appl. No.: 317,680

[22] Filed: Oct. 5, 1994

[30] Foreign Application Priority Data

Oct. 6, 1993 [DE] Germany .......................... 43 34 079.2

[51] Int. Cl.⁶ ................................................. G01S 13/18
[52] U.S. Cl. .......................... 342/124; 342/135; 342/136; 342/129; 342/132; 342/193
[58] Field of Search ................................. 342/124, 128, 342/129, 131, 132, 135, 136, 193

[56] References Cited

U.S. PATENT DOCUMENTS

| | | | |
|---|---|---|---|
| 4,072,947 | 2/1978 | Johnson | 342/103 |
| 4,744,040 | 5/1988 | Kawata et al. | 364/561 |
| 5,233,352 | 8/1993 | Cournane | 342/124 |
| 5,359,331 | 10/1994 | Adler | 342/124 |
| 5,384,541 | 1/1995 | Chu et al. | 324/617 |
| 5,420,591 | 5/1995 | Annee et al. | 342/188 |

*Primary Examiner*—John B. Sotomayor
*Attorney, Agent, or Firm*—McGlew and Tuttle, P.C.

[57] ABSTRACT

The present invention pertains to a radar range finder for high-precision, contactless range measurement, which is based on the FMCW principle and operates with digital signal processing at a limited frequency shift. One exemplary embodiment is described.

19 Claims, 8 Drawing Sheets

Evaluation: Determination of the maxima of all spectra, e.g., maximum in spectrum 3.
Range = $K/B_3$
K = Constant factor

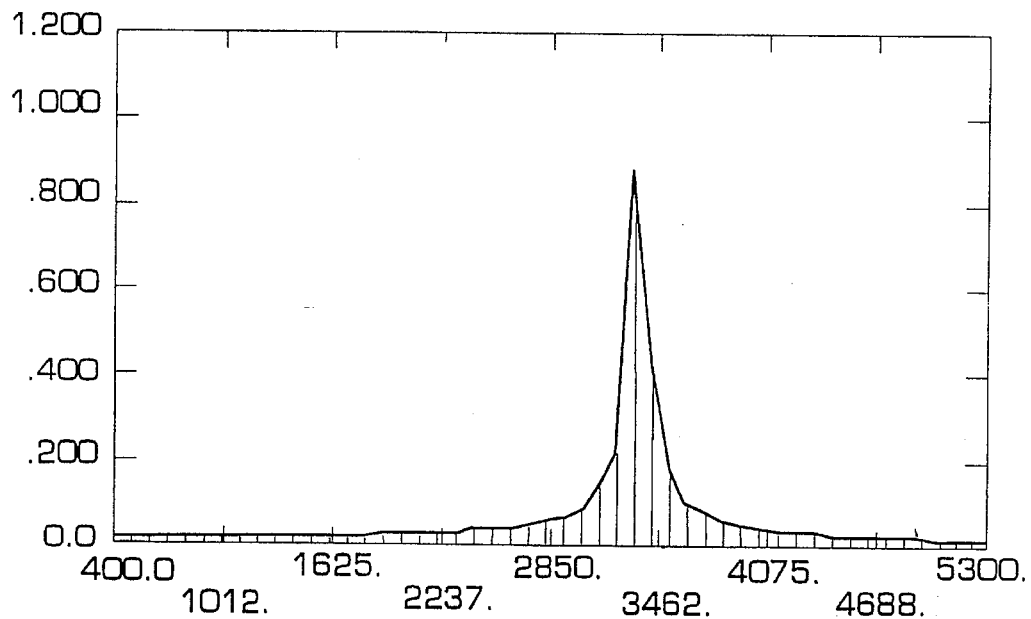
Fig. 6a   B = 250 MHz Starting Value
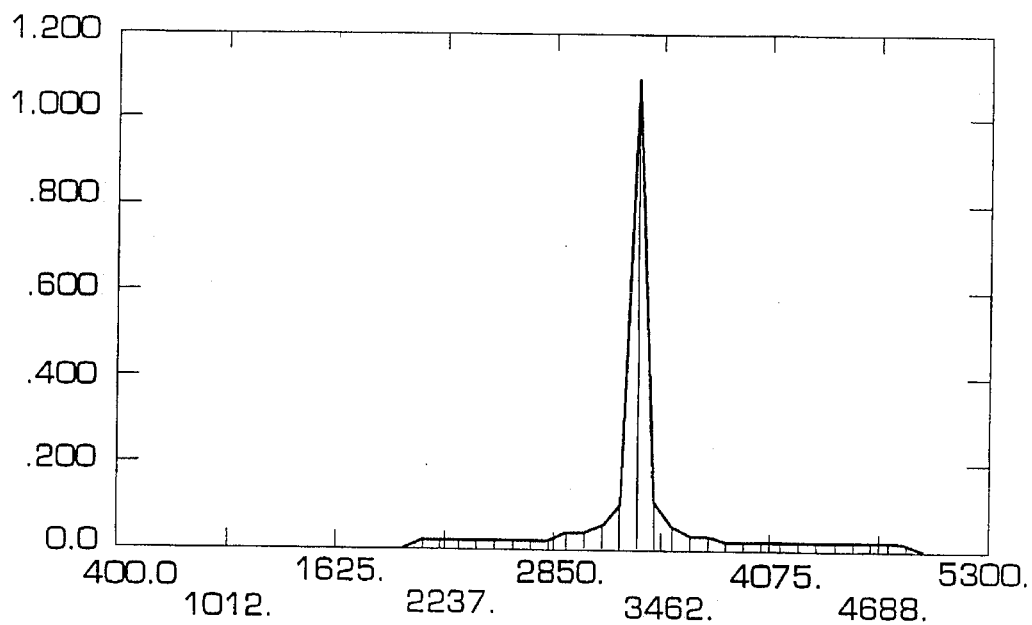
Fig. 6b   B = 248 MHz

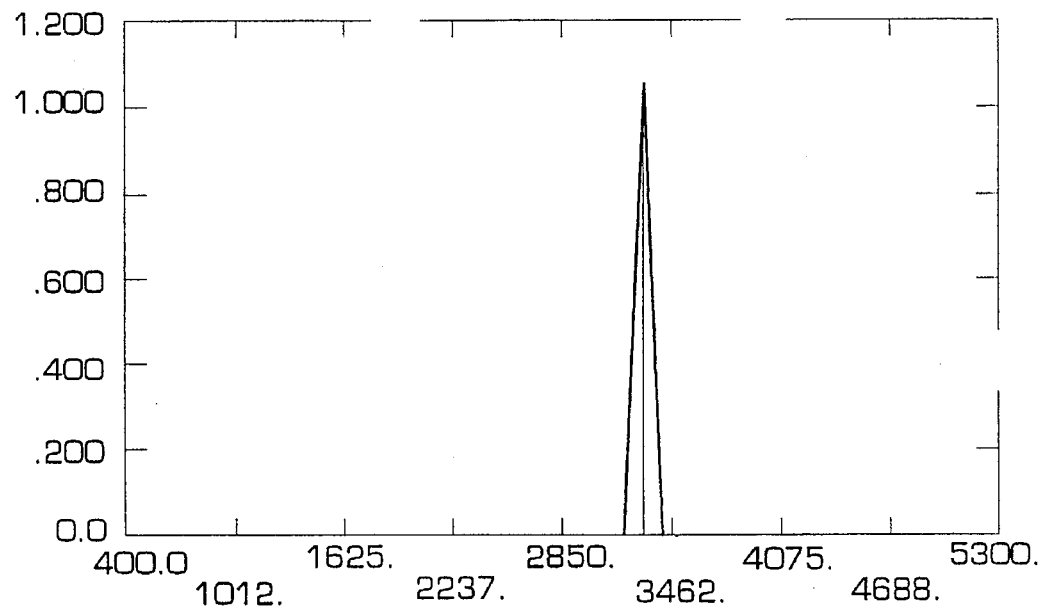
Fig. 6c  B = B opt. = 247.5 MHz
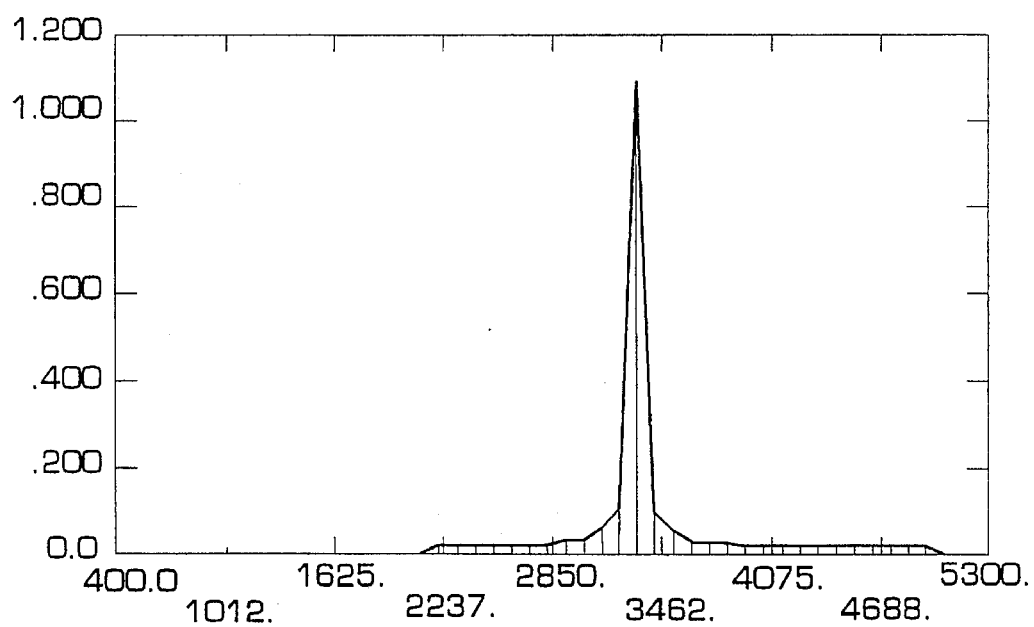
Fig. 6d  B = 247 MHz

HIGH-PRECISION RADAR RANGE FINDER

FIELD AND BACKGROUND OF THE INVENTION

The present invention pertains to a high-precision radar range finder, whose design corresponds to the FMCW principle, the radar range finder operating in a frequency range of 24.125 GHz±125 MHz, the range finder being particularly useful for closed containers.

Besides other fields of use, this device is preferably used in the level measuring technique. A great variety of designs of level meters have been known. The contactless level metering methods are based, besides radar methods, preferably on the travel time measurement in the ultrasound range or in the laser range. The ultrasound sensors have the drawback that the velocity of propagation of sound changes with the medium whose level is to be measured, as a result of which very substantial errors in measurement occur. The laser sensors have the drawback that, aside from the high purchase price, the level cannot usually be recognized in the case of clear liquids, because the laser beam is reflected from the bottom of the container rather than at the level. The radar sensors are free of these drawbacks.

The requirements imposed on a radar sensor are, aside from the high degree of reliability required, the measurement of the level to an accuracy in the cm range. Compliance with various regulations is required including specified frequency bands (FCC in the U.S.A. and FTZ-German Federal Central Bureau of Telecommunications) and others (e.g., approval by the German postal administration, as well as compliance with the protection requirements of the German Federal Institute for Physics and Technology, Group 3.5 "Explosion Protection of Electrical Equipment").

SUMMARY AND OBJECTS OF THE INVENTION

To reach an accuracy of measurement in the cm range, the transmitted signal is modulated either in the time range or in the frequency range. In the case of pulsed systems, extremely short pulses corresponding to the equation accuracy of measurement=velocity of light·pulse length/2 are required for this. At an accuracy of measurement of, e.g., 10 cm, this would correspond to a pulse length of 0.66 nanosec. This cannot be economically achieved for industrial applications with the technology currently available.

In the case of frequency modulation of the transmitted signal, the range resolution is determined by the modulation bandwidth, (deflection from the center frequency) according to the equation accuracy of measurement=velocity of light/(2·modulation bandwidth).

At an accuracy of measurement of, e.g., 10 cm, this would correspond to a modulation bandwidth of 1.5 GHz. This can be accomplished economically for higher frequencies, and the frequency approved for this application is 24.125 GHz, but the requirement of the German postal administration in terms of a band limitation of 24.125±125 MHz for the general FTZ approval is not met. The modulation bandwidth is reduced step by step, from one measurement to the next, beginning with the maximum allowable bandwidth (250 MHz).

The modulation method is shown schematically in FIG. 2. To determine the range between the level and the measuring apparatus, a spectral analysis of the received signal is performed by means of a discrete Fourier transformation. The relationships are represented in FIG. 3.

However, if general approval by the postal administration is not required, e.g., in closed containers, accuracies of a few mm can be reached according to the method described at a bandwidth of, e.g., 1.5 GHz.

The primary object of the present invention is to provide a high-precision radar level meter, which operates according to the FMCW principle with digital signal processing for high-precision range measurement with limited frequency shift.

According to the invention, a radar range finder is provided which is designed using the FMCW (frequency modulated continuous wave) principle and which operates in the frequency range of 24,125 GHz±125 MHz. High precision range determination is performed using means for determining the optimal or adapted frequency shift in a stepwise manner. Structure is provided for approximately determining the allowable shift, after which the shift is successively broken down until an integer multiple of range gates generated corresponds to the exact distance between the measuring apparatus and the reflection surface. The maximum amplitude of the spectrum or the minimum of the sidelobes of the measurement sequence is used as the indicator of the optimal or adapted shift. A control loop is provided including an oscillator, a directional coupler, a divider chain, a counter as well as a microprocessor and a digital to analog converter with a frequency which is formed having an integer multiple which is the actual transmitted frequency.

A video device is provided with a device for level processing and is coupled with a controllable amplifier, controlled by the microprocessor and with means for band filtration. The oscillator (preferably a voltage controlled oscillator) is followed by an amplifier which is optimized for generating a fifth harmonic of the oscillator frequency. The amplifier is associated with the band filter for the fifth harmonic of the oscillator frequency and with an additional amplifier for raising the level and for decoupling. The transmitted signal is separated from the receive signal by a directional Coupler. The receiver has an LO buffer amplifier and a mixer which are manufactured according to the highly integrated technology (monolithic microwave integrated circuit). To convert the voltage controlled oscillator frequency into the MHz range, a divider chain with a plurality of divider steps is arranged in the control loop. The divider chain is part of a control loop, which performs an auto calibration cycle on the oscillator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIGS. 6a–6d are diagrams of spectrum/echo profiles with different frequency shifts (B)

DETAILED DESCRIPTION OF THE PREFERRED EMBODIMENT

Figure 3:
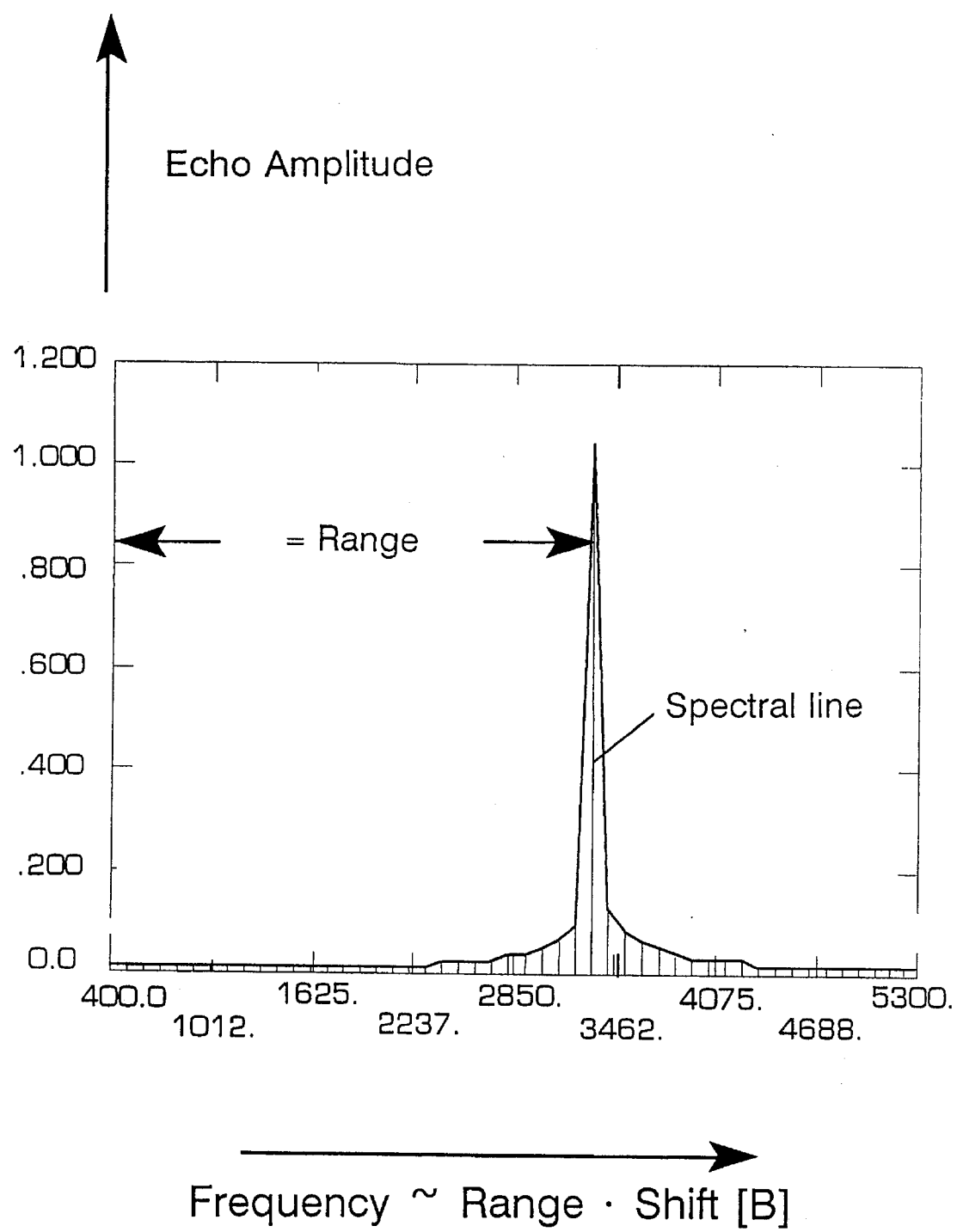
FIG. 3 is a diagram for range determination from the spectrum of the received signal.
Figure 4:
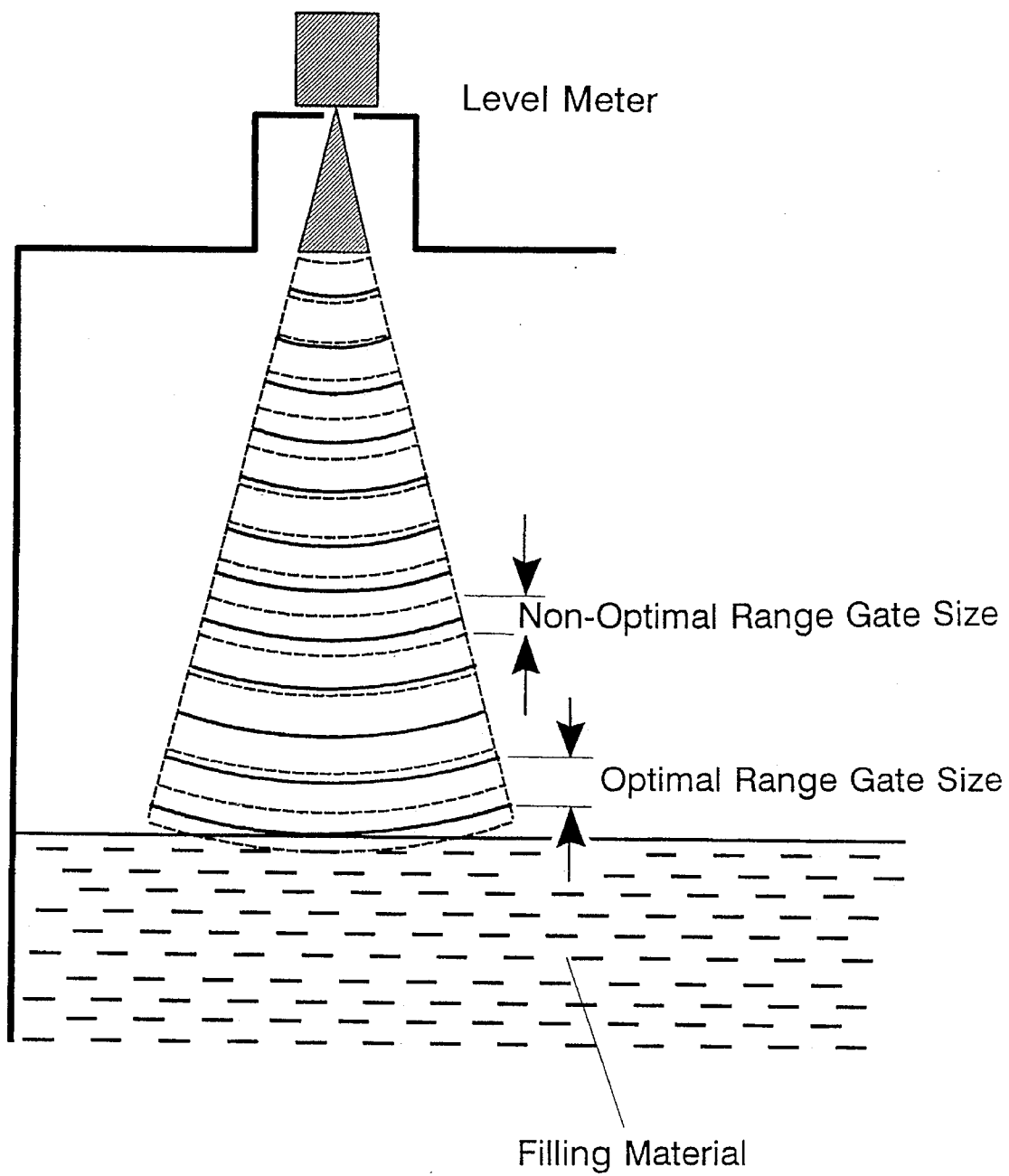
FIG. 4 is a schematic diagram of a discrete measurement of the range by distance gates.

The discrete Fourier transformation of a time signal quasi breaks down the detected range into so-called distance gates, also called range gates, as is illustrated in FIG. 4, and each range gate corresponds to one spectral line, as is shown in FIG. 3.

Figure 1:
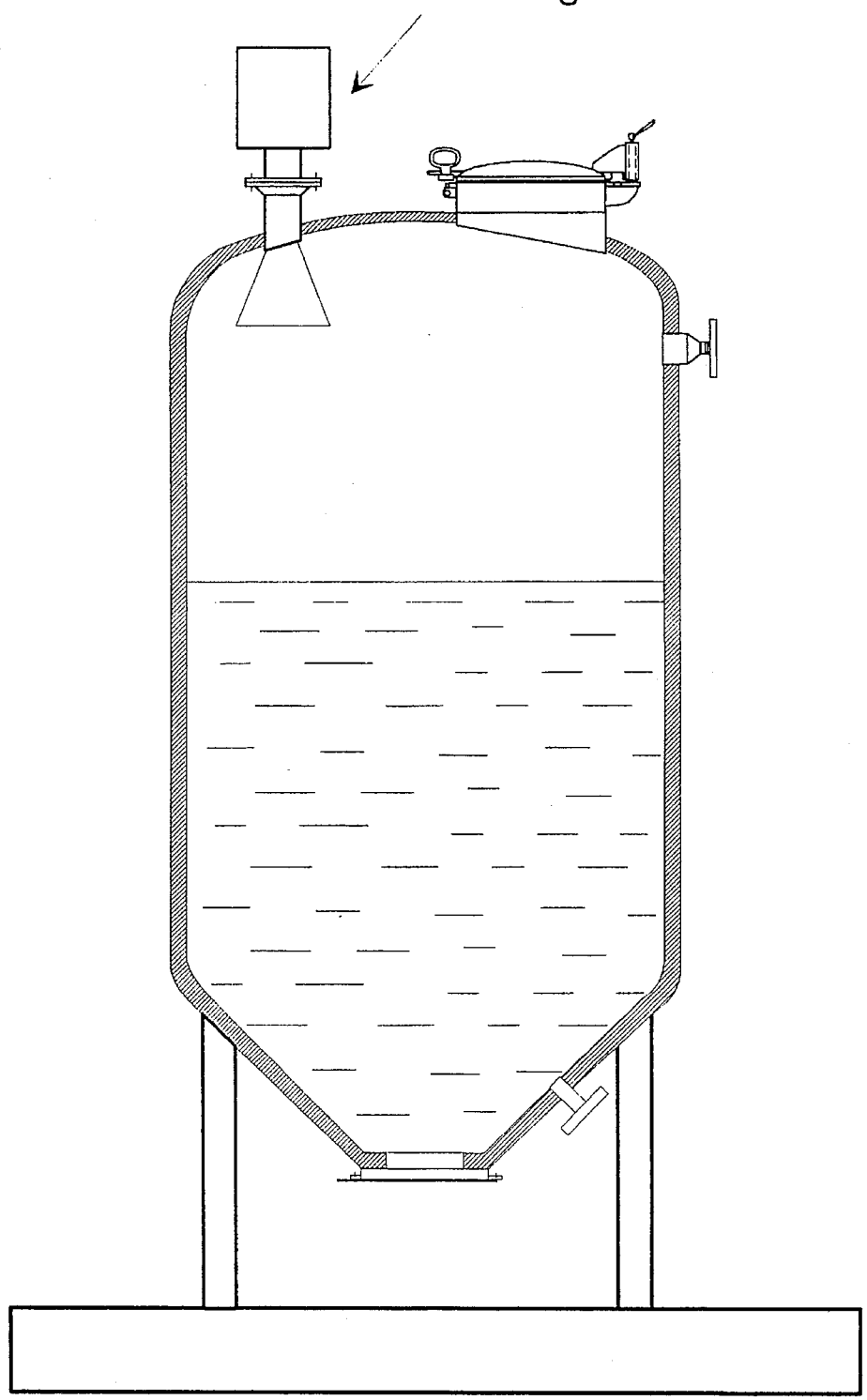
FIG. 1 is a schematic view of a level measurement by a radar level meter.

In the case of level measurement, it is necessary to deal with a single, dominant "reflector," namely, the surface of the filling material, as can be determined from FIG. 1. All other reflectors, e.g., container wall, etc., are not located in the major lobe of the antenna and therefore they are only very weakly noticeable, if at all, in the received signal.

The following method of high-precision range determination is proposed for this special case:

The echo amplitude of the received signal reaches its maximum precisely when a suitably large range gate is found, so that the range gate can be placed exactly n times between the measuring apparatus and the reflector surface.

Figure 2:
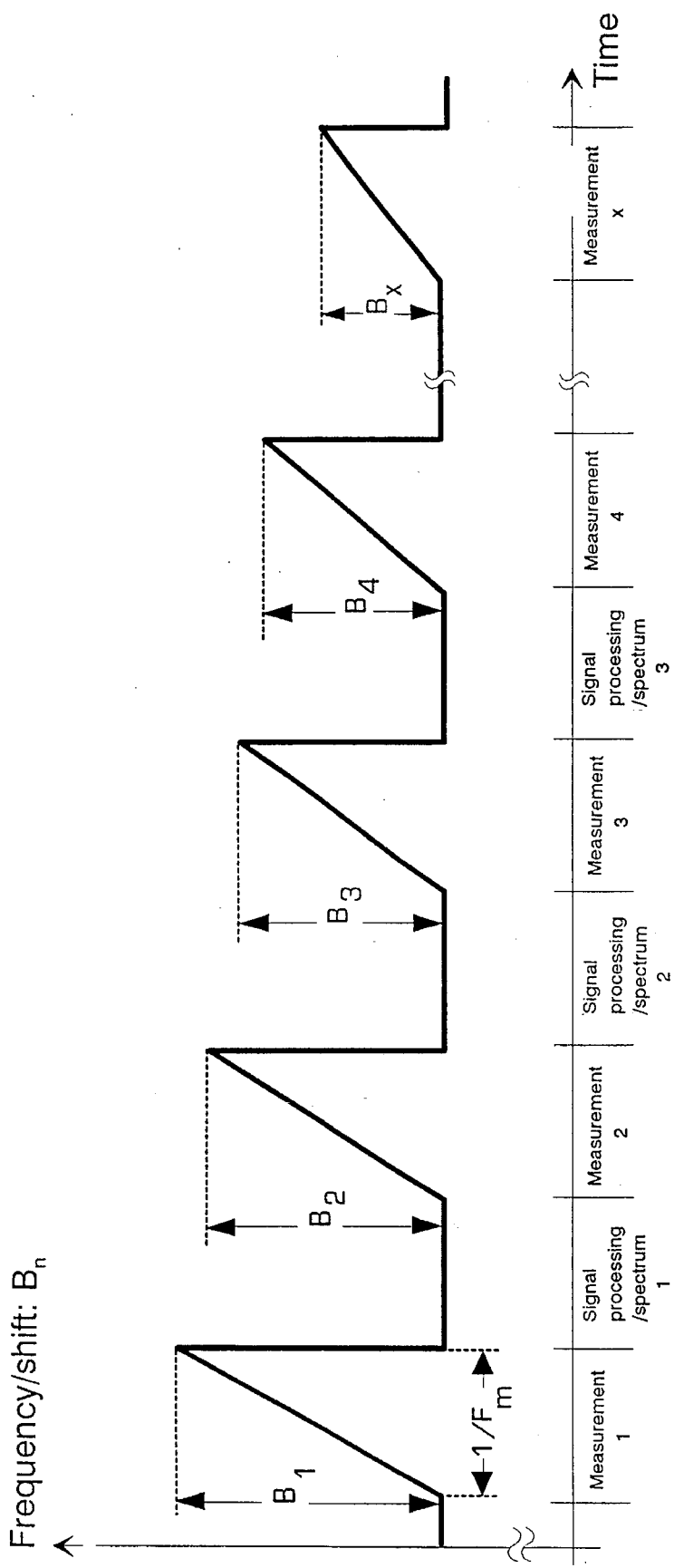
FIG. 2 is a modulation/bandwidth-time diagram of the modulation method.
Figure 5:
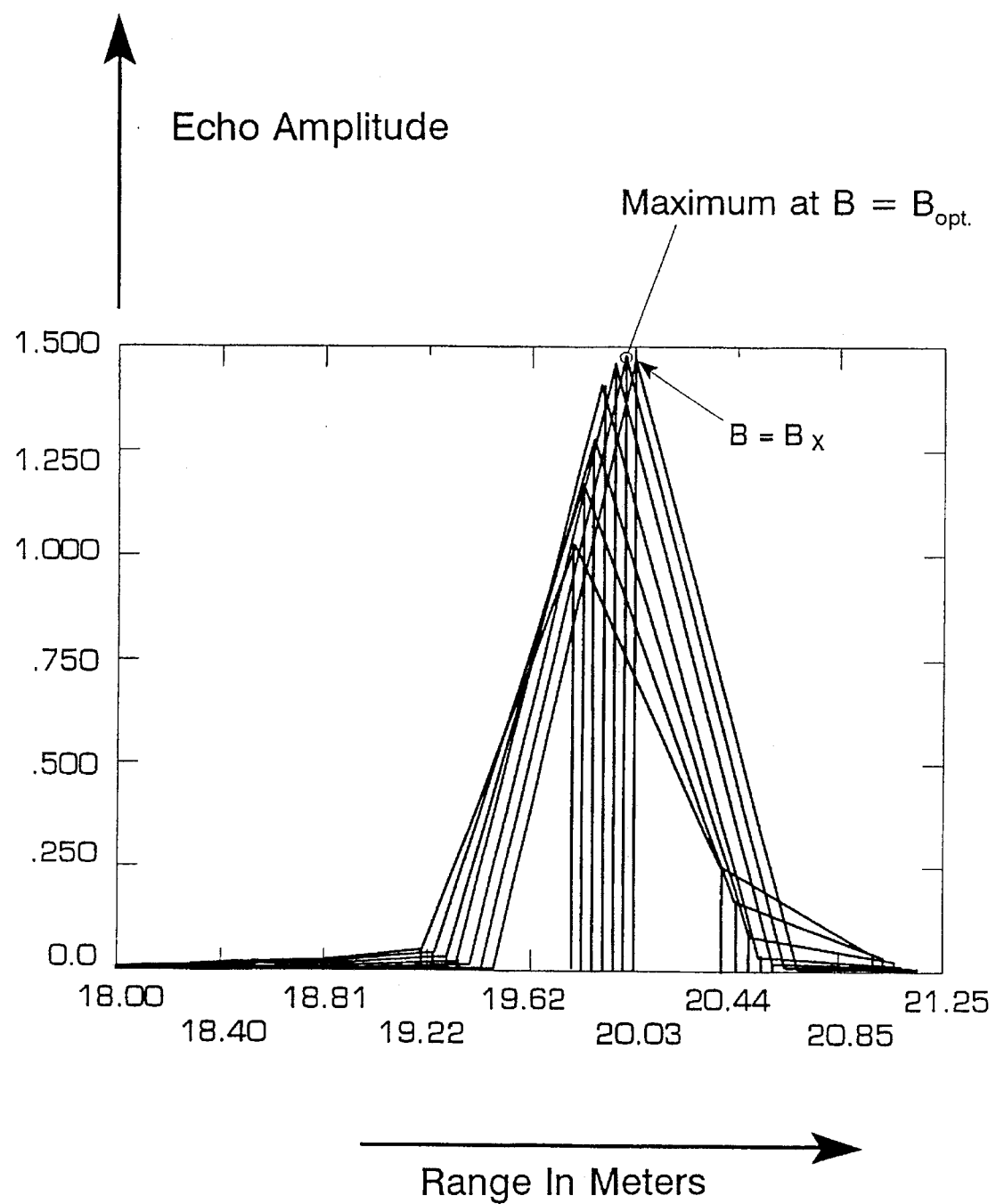
FIG. 5 is a diagram for superimposing different spectra at different frequency shifts ($B_x$)

The detection method is carried out as follows:

The process is begun with the maximum allowable shift of 250 MHz corresponding to the extension of the range gate, equaling 0.6 m. The apparatus first approximately determines the range. Depending on the approximate distance determined, the range of reduction of the shift as well as the step size from one measurement cycle to the next are subsequently set. The shift is then reduced stepwise, from one measurement to the next, until the extension of the range gate fits exactly n times into the range between the measuring apparatus and the level. This is determined by determining the maximum of the spectrum of the measurement series (cf. FIG. 5), after which the range is calculated from the simple equation $$R = Fb \cdot c/(2 \cdot B \cdot Fm)$$

in which:
R=range,
Fb=beat frequency (corresponding to the position of the echo amplitude in the spectrum),
c=velocity of light,
B="optimized" or adapted frequency shift, and
Fm=modulation frequency (cf. FIG. 2).

The sequence of FIGS. 6a through 6d shows how the secondary lines in the spectrum decrease in the course of the stepwise optimization or adaption of the shift. Consequently, the signal energy is concentrated onto the principal line, so that it is "maximal" in the case of the optimal shift bandwidth.

Consequently, the accuracy of the range is no longer determined by the maximum possible shift alone in this process, but mainly by the accuracy with which the optimal shift is determined. This depends, above all, on the selected step size, i.e., the maximum allowable measurement time.

It should also be noted that the shift can be set with high accuracy, and that the frequency modulation should be performed as linearly as possible in order to minimize the side lines represented in FIGS. 6a through 6d, which is made possible by the frequency generation method described below.

Figure 7:
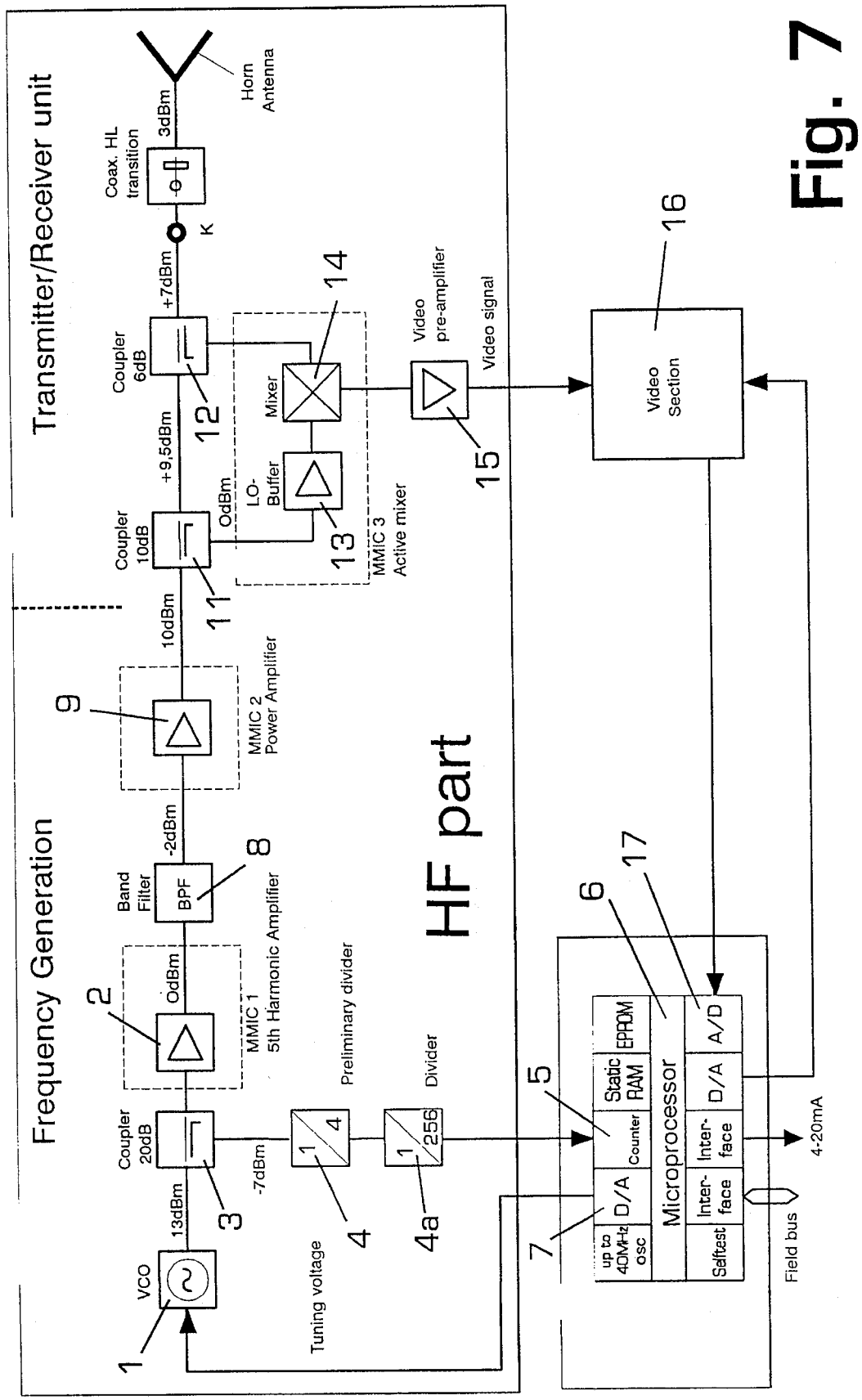
FIG. 7 shows a block diagram of an exemplary embodiment of a radar level meter.

As is illustrated in FIG. 7, the voltage-controlled oscillator (VCO) 1 generates the basic frequency of 4.825 GHz. This oscillator signal is amplified in the buffer amplifier 2 following it, and the oscillator 1 is at the same time decoupled from additional steps in order to avoid the so-called pulling effect, which would lead to a deviation from the linearity of the frequency shift and consequently to an inaccuracy in range determination.

The buffer amplifier 2 operates in the saturation mode, thus generating frequency components at multiples of the basic frequency. It is designed to be such that the fifth harmonic (24.125 GHz) is particularly salient. The directional coupler 3 (20 dB) is dimensioned for the fundamental wave, and it decouples the VCO signal to the divider chain 4, 4a with a suitable level. The divider chain 4, 4a, which consists of a plurality of divider stages, converts the oscillator frequency into the MHz range. The control loop is closed via a counter 5, a microprocessor 6, and a D/A converter 7 for the required linearization of this frequency. This control loop makes it possible to eliminate both aging effects of the components and temperature-dependent long-term drifts of the frequency of the oscillator 1 via an autocalibration cycle. The fifth harmonic of the oscillator basic frequency of 24.125 GHz, which is already preferably generated, is selected with the band filter 8, and all other multiples as well as the fundamental wave are suppressed.

The level is processed once again in a connected power amplifier 9 and additional decoupling of the oscillator unit from loaded impedances is achieved at the same time.

The transmitting/receiving unit of the radar level meter proposed here has a directional coupler 11 (10 dB), which decouples part of the transmitted signal for the receiver. Its transmitting branch main arm leads directly to the 6-dB directional coupler 12, which separates the transmitted signal and the received signal. The level of the decoupled part of the transmitted signal is raised in the LO buffer amplifier 13 in order to achieve optimal level control of the mixer 14. The received signal enters the mixer 14 from the antenna via the 6-dB coupler 12, and the video signal is formed in the basic band (beat signal) due to so-called homodyne frequency conversion at the IF (intermediate frequency) output of the mixer 14. This beat signal is subjected to low-noise amplification in the subsequent IF amplifier 15, and decoupling of the mixer 14 from the subsequent filters and amplifier stages of the video part 16 is also achieved at the same time. This video section is used essentially for level adaption and frequency filtering for the A/D converter 17 in the microcomputer 6, in which the control of the overall system, as well as the signal processing, and the range determination are performed.

While a specific embodiment of the invention has been shown and described in detail to illustrate the application of the principles of the invention, it will be understood that the invention may be embodied otherwise without departing from such principles.

What is claimed is:

1. Radar range finder using the FMCW principle and operating in a frequency range of 24.125 GHz±125 MHz, comprising:

high frequency signal generating means for emitting a high frequency signal for range determination including a transmitter/receiver unit generating range gates and means for approximately determining a range between said transmitter/receiver unit and a reflection surface by determining a maximum allowable frequency shift;

means for successively decreasing the frequency shift until an integer multiple of range gates generated corresponds to an exact distance between the transmitting element and the reflection surface and for using the maximum amplitude of the spectrum of the measurement sequence as an indicator of an optimal frequency shift; and control loop means including an oscillator, a directional coupler, a divider chain, a counter as well as a microprocessor and a digital analog converter for forming a frequency whose integer multiple is the actual transmitted frequency.

2. Radar range finder according to claim 1, further comprising a video device including a device for level processing, said video device being coupled with a controllable amplifier, controlled by said microprocessor and being coupled with a band filtration means for filtering frequencies in a defined frequency bandwidth.

3. Radar range finder according to claim 1, wherein said oscillator is a voltage controlled oscillator and is followed in said control loop by an amplifier, said amplifier being optimized for generating a fifth harmonic of a frequency signal generated by said oscillator, said amplifier being associated with band filter means for filtering frequencies for the fifth harmonic of the oscillator frequency and said amplifier being associated with an additional amplifier for raising a level of said frequency and for decoupling said frequency.

4. Radar range finder according to claim 2, wherein said oscillator is a voltage controlled oscillator and is followed in said control loop by an amplifier, said amplifier being optimized for generating a fifth harmonic of a frequency signal generated by said oscillator, said amplifier being associated with band filter means for filtering frequencies for the fifth harmonic of the oscillator frequency and said amplifier being associated with an additional amplifier for raising a level of said frequency and for decoupling said frequency.

5. Range finder according to claim 3, further comprising a directional coupler for separating a transmitted frequency signal from a received signal.

6. Range finder according to claim 4, further comprising a directional coupler for separating a transmitted frequency signal from a received signal.

7. Range finder according to claim 5, wherein said receiver has an LO buffer amplifier and a mixer.

8. Radar range finder according to claim 7, wherein said amplifier and mixer are formed using highly integrated technology including monolithic microwave integrated circuits.

9. Radar range finder according to claim 8, wherein said divider chain includes a plurality of divider steps to convert the voltage controlled oscillator frequency into the MHz range, control loop including means for performing an auto calibration cycle.

10. A method for measuring distance, the method comprising the steps of:

emitting an emitted signal to be reflected by a target;

receiving a reflected signal reflected from the target;

frequency modulating said emitted signal over an initial bandwidth, said initial bandwidth having at least one range gate;

decreasing said initial bandwidth until an adapted bandwidth is reached, said adapted bandwidth having an integer multiple of range gates substantially equal to the distance;

comparing said emitted signal with said reflected signal at said adapted bandwidth to determine a measurement of the distance.

11. A method in accordance with claim 10, wherein:

said comparing determines a difference frequency between a frequency of said reflected signal and a frequency of said emitted signal at said adapted bandwidth.

12. A method in accordance with claim 11, wherein:

said frequency of said emitted signal and said reflected signal are measured at a time when said reflected signal is received.

13. A method in accordance with claim 10, further comprising:

determining an initial difference frequency between a frequency of said reflected signal with a frequency of said emitted signal at said initial bandwidth;

determining an initial measurement of distance from said initial difference frequency;

determining a magnitude of stepwise decreases of said initial bandwidth to arrive at said adapted bandwidth from said initial measurement;

decreasing said initial bandwidth by said stepwise decreases.

14. A method in accordance with claim 10, wherein:

said adapted bandwidth is determined by measuring an amplitude of said reflected signal and determining when said amplitude reaches a maximum.

15. A method in accordance with claim 10, wherein:

said adapted bandwidth is determined when signal energy of said reflected signal is most concentrated.

16. A method in accordance with claim 10, wherein:

said adapted bandwidth is determined when signal energy of said reflected signal is most concentrated at a single frequency component of a Fourier transform of said reflected signal.

17. A range finder comprising:

transmitter means for generating an emitted signal to be reflected by a target, said transmitter means frequency modulating said emitted signal over an initial bandwidth, said initial bandwidth having at least one range gate, said transmitter means decreasing said initial bandwidth until an adapted bandwidth is reached, said adapted bandwidth having an integer multiple of range gates substantially equal to the distance;

receiver means for receiving a reflected signal reflected from the target;

processor means for comparing said emitted signal with said reflected signal at said adapted bandwidth to determine a measurement of the distance.

18. A range finder in accordance with claim 17, further comprising:

a mixer means for mixing said emitted and reflected signals into a beat signal with a beat frequency.

19. A range finder in accordance with claim 17, wherein:

said processing means determines a maximum signal energy concentration of said reflected signal during decreasing bandwidth.

* * * * *